UNITED STATES PATENT OFFICE.

ANSON W. ALLEN, OF PHILADELPHIA, PENNSYLVANIA.

MANUFACTURE OF OPEN-HEARTH STEEL.

No. 870,921. Specification of Letters Patent. Patented Nov. 12, 1907.

Application filed April 3, 1906. Serial No. 309,726.

*To all whom it may concern:*

Be it known that I, ANSON W. ALLEN, of Philadelphia, in the county of Philadelphia and State of Pennsylvania, have invented an Improvement in the Manufacture of Open-Hearth Steel, of which the following is a specification.

I have discovered that important improvements in the manufacture of open-hearth steel can be obtained by charging in a basic lined open-hearth furnace a charge of iron oxid and burnt lime, heating the same, and then pouring upon the heated charge of lime and iron oxid a charge of molten metal. When this is done a reaction immediately ensues, in which the phosphorus and silicon of the iron are caused to combine with the iron oxid and lime, forming a molten slag, so that the iron rapidly becomes dephosphorized and desiliconized. This reaction is not violent and does not cause the overflow of the slag from the furnace, but the slag containing the phosphorus and silicon is allowed to remain, either in whole or in major part, as a floating body upon the surface of the iron. This can be done without important delay to the operation of the furnace, because the slag being produced without violent reaction, is dense in its nature and is not foamy, as the slag which is produced by reaction with unburnt limestone and iron oxid, and therefore does not interfere with the transmission of the heat from the furnace to the iron below. The advantage of thus leaving the slag, or the bulk of it, remaining in the furnace is that a very large saving of iron is effected thereby. If the slag is immediately tapped off after a violent reaction, a large part of the iron oxid passes with it; but by allowing it to remain in the furnace, the iron oxid contained in the slag reacts with the charge of molten iron, decarbonizing the same and giving up the iron of the slag to the bath, so that when the slag is eventually tapped from the furnace it is lean in iron and therefore is not the cause of waste.

In the practice of my invention I may introduce scrap into the furnace as part of the original charge to the extent of one-third of the total metal charge, though an important advantage of my invention is that it enables me to conduct the open-hearth operation without the use of scrap. I may also, in the practice of the invention, withdraw a part of the slag from the furnace after the initial reaction caused by the introduction of the molten iron, though I deem it desirable, as above stated, that all of the slag should be allowed to remain in the furnace, and it is essential to my invention that a considerable part of the slag produced by the reaction be thus allowed to remain.

To inform those skilled in the art as to the preferable practice of the invention, I will now proceed to describe an open-hearth heat in which the invention was carried out. In this heat I introduced on the bottom of the furnace a charge of scrap steel and placed upon it iron oxid in the form of mill scale amounting to about 20 per cent. of the metal charge of the furnace, and burnt lime amounting to about $4\frac{1}{2}$ per cent. thereof. I then placed scrap on top of the lime and oxid, the total amount of scrap equaling about 20 per cent. of the metal charge of the furnace. I then heated these materials for a period of one hour and one-half, the heat being preferably continued until the iron oxid began to sweat or show signs of incipient fusion, but the length of the preheating period may be varied as desired.

The purpose of preheating the oxid to a considerable extent is to render the reaction more efficient, for unless the iron oxid is heated to a state approaching sweating or incipient fusion the desired reaction will not be obtained. The order of introducing the iron oxid and lime and scrap relatively to each other may be changed. I then added to the furnace molten metal, introducing it in two lots at an interval of 35 minutes apart, each portion introduced amounting to 26,850 pounds and containing approximately 3.8 per cent. of carbon and .8 per cent. phosphorus. At the introduction of the first lot of molten iron to the furnace a reaction took place which was quiet in its nature and not violent, and which produced a rapid elimination of the phosphorus from the metal, so that in 5 minutes the phosphorus was reduced to .612 per cent.; in 10 minutes it was reduced to .396 per cent.; in 15 minutes, to .288 per cent.; and in 20 minutes to .070 per cent. On the introduction of the second ladle of iron, which was made 35 minutes after the pouring of the first ladle, a supplemental reaction ensued, and in 5 minutes thereafter the charge in the furnace contained .392 per cent. phosphorus; in 10 minutes it contained .268 per cent. phosphorus; in 15 minutes it contained .224 per cent.; in 25 minutes, .097 per cent. phorphorus, and in 45 minutes .016 per cent. phosphorus.

The carbon was eliminated from the metal more slowly, and the entire heat lasted 4 hours and 55 minutes. The total metal output of this furnace was 72,390 pounds, or 6,520 pounds more than was charged into the furnace in the form of metallic iron, the addition being obtained from reduction of the iron ore. The slag was tapped from the furnace at the end of the heat and was not removed previously. When tapped it contained 14.15 per cent. of iron.

The operation of the furnace was very rapid, and I have found that by following this process I am enabled to largely increase the output. For example, a furnace which previously yielded twenty 30-ton heats per week, by my process will now yield twenty-six 30-ton heats per week.

It is to be understood that the heat just described is not to be taken as limiting my invention to the particular operation described therein, but that many variations may be made from the said operation without departing from the scope of my invention.

The advantages of the invention are due to the fact that I am enabled, without the use of the large scrap charge ordinarily employed in the pig and scrap process, which amounts approximately to 50 per cent or more of scrap, to produce basic open-hearth steel rapidly and with a minimum of labor and with a minimum of waste of iron, the essentials of the invention being the use of burnt lime as part of the initial heated charge of the furnace, and the retaining of the slag or the bulk of the slag in the furnace after the initial reaction takes place, in order that the iron of the slag may not be lost.

If desired, mill cinder or iron ore may be substituted in whole or in part for the roll scale as the iron oxid to be employed in the reaction.

Those skilled in the art will be able to modify the process in various ways without departure from the invention as stated in the claims, since

What I claim is:

1. The method herein described of making open hearth steel which consists in introducing into a basic open hearth furnace iron oxid and burnt lime, heating the same to a state approaching incipient fusion, then introducing the molten pig iron containing phosphorus and retaining on the bath the bulk of the slag until the final stages of the heat, thus obtaining a reaction which eliminates the phosphorus from the iron.

2. The herein described method of making open-hearth steel, which consists in introducing iron oxid and burnt lime to the bottom of a basic open-hearth furnace, heating the furnace until the iron oxid begins to sweat or show signs of incipient fusion, then pouring molten pig iron containing phosphorus upon the surface of the initial charge to obtain a reaction for eliminating the phosphorus from the iron, and for retaining the slag or the bulk thereof on the surface of the bath until the final stage of the heat to permit the slag to give up its iron to the bath.

In testimony whereof, I have hereunto set my hand.

ANSON W. ALLEN.

Witnesses:
   THOMAS W. BAKEWELL,
   J. H. GRAY.